No. 772,121. PATENTED OCT. 11, 1904.
J. ANDERSON.
AUTOMATIC POULTRY FEEDER.
APPLICATION FILED MAY 28, 1903.
NO MODEL. 2 SHEETS—SHEET 2.

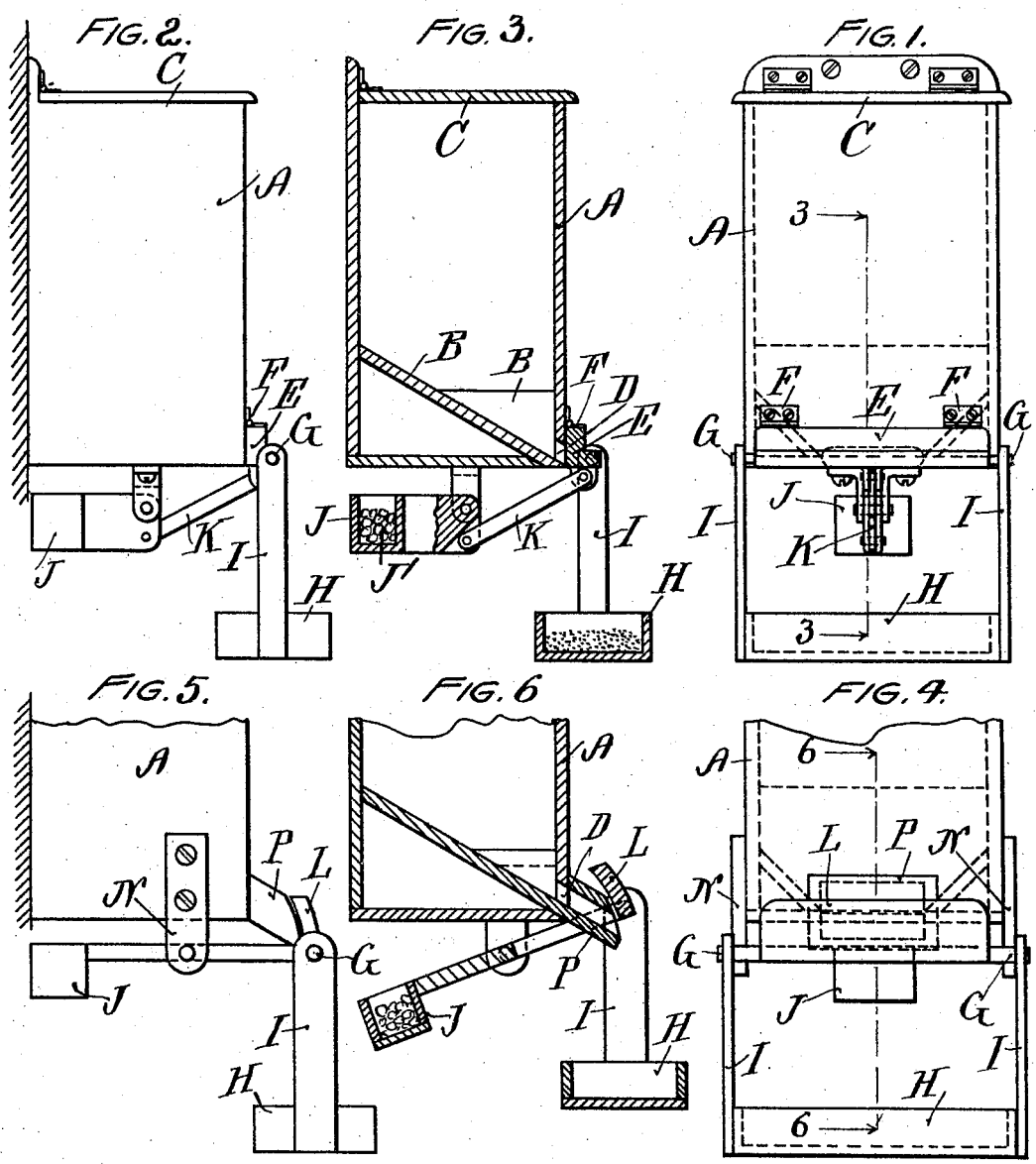

WITNESSES
Chas. P. Day.
Anselm J. Fisher

INVENTOR
John Anderson
BY S. Schofield
ATTORNEY.

No. 772,121. Patented October 11, 1904.

UNITED STATES PATENT OFFICE.

JOHN ANDERSON, OF SLOCUMVILLE, RHODE ISLAND.

AUTOMATIC POULTRY-FEEDER.

SPECIFICATION forming part of Letters Patent No. 772,121, dated October 11, 1904.

Application filed May 28, 1903. Serial No. 159,198. (No model.)

*To all whom it may concern:*

Be it known that I, JOHN ANDERSON, a subject of the King of Great Britain, residing at Slocumville, in the county of Washington and State of Rhode Island, have invented a new and useful Improvement in Automatic Poultry-Feeders, of which the following is a specification.

The nature of my invention consists in the employment of a balanced feed-pan with a hopper for the grain and a closing-gate for the hopper, as hereinafter set forth.

Figure 8:
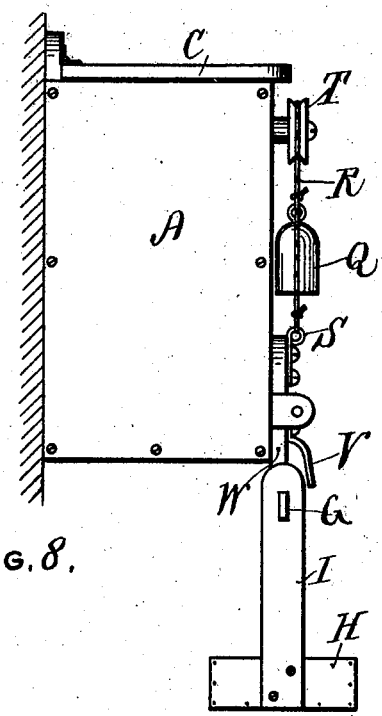
Figure 7:
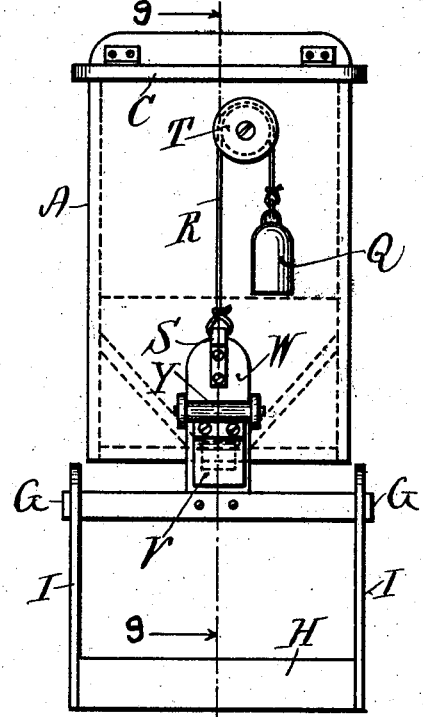
Figure 9:
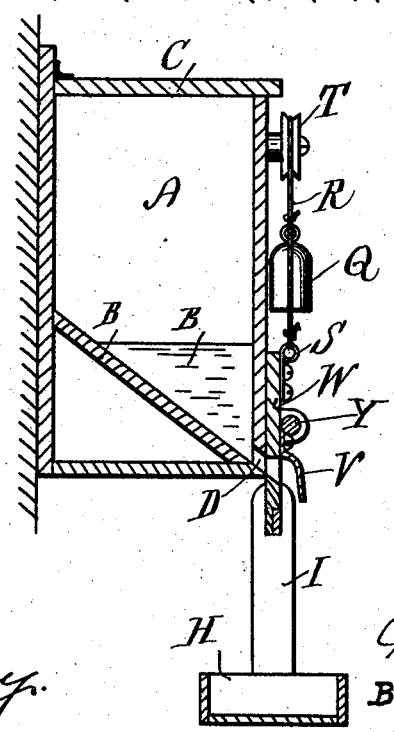

In the accompanying drawings, Figure 1 represents a front elevation of an automatic poultry-feeder embodying my invention. Fig. 2 represents a side view of the same. Fig. 3 represents a section taken in the line 3 3 of Fig. 1. Fig. 4 represents a partial front view showing a modification. Fig. 5 represents a side view of the same. Fig. 6 represents a section taken in the line 6 6 of Fig. 4. Fig. 7 represents a front view showing another modification. Fig. 8 represents a side view of the same. Fig. 9 represents a section taken in the line 9 9 of Fig. 7.

In the drawings, Figs. 1, 2, and 3, A represents the hopper, provided with the downwardly-inclined bottom B and the hinged cover C. The delivery-opening D of the hopper is closed by means of the gate E, hinged to the front of the hopper at the hinges F F. The gate E is provided with the projecting studs G G, upon which is hung the removable feed-pan H by means of the upright arms I I, secured to the opposite ends of the feed-pan, the said arms being adapted to be slipped on and off of the studs G G of the gate. Under the hopper A is pivoted the weight-box J, in which is placed the weight material J', the said box being connected with the gate E by means of the inclined link K, so that upon the downward movement of the weight-box the gate will be turned outward upon its hinges F F, thus uncovering the opening D of the hopper to allow the grain to fall therefrom into the feed-pan, and when a sufficient quantity of grain has passed from the hopper into the feed-pan to overbalance the weight material in the box then the gate will be caused to close and shut off the supply of grain, and this operation will be automatically repeated as often as the grain in the feed-pan is consumed by the poultry.

A modification of my invention is shown in Figs. 4, 5, and 6, in which the gate L is pivoted to the slide-brackets N N and moves over the curved end of a spout P, extending outward from the hopper, the feed-box H being suspended from the projecting studs G G, as before described, and in this case, as in the former figures of the drawings, the falling of the weight-box will cause the opening of the gate and the passage of the grain from the hopper to the feed-pan, and when a sufficient quantity has been deposited therein the weight-box J will be raised and the gate L closed.

Another modification is shown in Figs. 7, 8, and 9, in which the gate W is arranged to slide up and down at the front of the hopper, the said gate and the connected feed-box being counterbalanced by means of the weight Q, suspended by a cord R, which is connected with the gate at the eye S and passes over the pulley T, and in this case upon the falling of the gate the opening D of the hopper will be uncovered, thus allowing the grain to pass to the suspended feed-pan, and upon the proper filling of the said pan the gate will be closed and the weight raised as before. The sheet-metal guard V is placed in front of the gate to guide the grain downward into the feed-pan and the guide-roller Y arranged in front of the gate to avoid friction, and thus cause the gate to be easily moved. The hopper A may be either secured to the wall of a building or to the side of a post or may be provided with legs, as desired.

I claim as my invention—

In a poultry-feeder, the combination of the hopper, with the weighted gate for closing the discharge-opening of the hopper, the opposite studs projecting from the gate, and the pendent removable feed-pan supported by the studs, substantially as described.

JOHN ANDERSON.

Witnesses:
SOCRATES SCHOLFIELD,
JOHN MITCHELL.